US012739248B1

(12) United States Patent
(10) Patent No.: US 12,739,248 B1
(45) Date of Patent: Sep. 15, 2026

Kinder et al.

(54) SYSTEMS AND METHODS FOR IDENTITY VERIFICATION VIA THIRD-PARTY DIGITAL IDENTITY SERVICE

(71) Applicant: Nametag Inc., Seattle, WA (US)

(72) Inventors: Ross Rowland Kinder, Ann Arbor, MI (US); Jonathan Bauer, Emeryville, CA (US); Benjamin Michael Fenwick, Papillion, NE (US); Haris Choudhary, Redmond, WA (US)

(73) Assignee: Nametag Inc., Seattle, WA (US)

( * ) Notice: Subject to any disclaimer, the term of this patent is extended or adjusted under 35 U.S.C. 154(b) by 0 days.

(21) Appl. No.: 19/180,927

(22) Filed: Apr. 16, 2025

(51) Int. Cl.
*H04L 9/40* (2022.01)

(52) U.S. Cl.
CPC ...... *H04L 63/0884* (2013.01); *H04L 63/0838* (2013.01); *H04L 63/0861* (2013.01); *H04L 63/102* (2013.01)

(58) Field of Classification Search
CPC ... H04L 63/083; H04L 63/166; H04L 9/3073; H04L 63/08; H04L 63/0861; H04L 63/0428; H04L 63/0838; H04L 63/0853; H04L 63/0884; H04L 67/02; H04L 63/0876; H04L 67/20; H04L 2463/082; H04L 63/0815; H04L 63/0823; H04L 63/102; H04L 63/126; H04L 63/20; H04W 12/06; H04W 12/71; H04W 12/65; H04W 12/67; H04W 12/77; H04W 12/02; H04W 12/03; H04W 12/068; H04W 12/069;

(Continued)

(56) References Cited

U.S. PATENT DOCUMENTS 8,136,148 B1 * 3/2012 Chayanam .............. G06F 21/34 715/780
8,544,067 B2 * 9/2013 Grieve .................... H04L 67/02 713/168

(Continued)

OTHER PUBLICATIONS

Organiser �haar verification now as simple as UPI payment”: Bharat Govtunveils face ID-based digital identity app 10 pages https://urldefense.com/v3/__https:/organiser.org/2025/04/10/286720/bharat/aadhaar-verification-now-as-simple-as-upi-payment-bharat-govt-unveils-face-id-based-digital-identity-app/__;!!L2Ps738!03_Y_xCwLFXv5vMhI0BGfZ4B-nsGe0ev5b5L-87s1Cx7QX1V73z-ILOaPHzQ4b_4_A1Yp4gifb9NItwB$.

(Continued)

*Primary Examiner* — Sharif E Ullah
(74) *Attorney, Agent, or Firm* — Foley & Lardner LLP

(57) ABSTRACT

Systems and methods for authenticating a user may include receiving a first data packet. The first data packet may include a biometric image captured during an authentication process an identifier identifying a resource server. The first data packet may be received in connection with a request for authenticating the user to access the resource server. The method may include receiving a second data packet. The second data packet may include a digital identity document of the user. The digital identity document may include an image of the user. The method may include verifying an authenticity of the digital identity document, based on information from the second data packet. The method may include comparing the image data and the digital identity document. The method may include transmitting authentication information user to the resource server. The authentication information may be transmitted based on the comparison and authenticity of the digital identity document.

16 Claims, 13 Drawing Sheets

(58) Field of Classification Search
CPC ..... H04W 12/68; H04W 12/00; H04W 12/04; G06F 21/31; G06F 21/6245; G06F 21/32; G06F 3/0482; G06F 3/04845; G06F 21/36; G06F 21/45; G06F 3/04817; G06F 3/0488; G06F 9/451
USPC ........................................................... 726/4
See application file for complete search history.

(56) References Cited

U.S. PATENT DOCUMENTS

| | | | | |
|---|---|---|---|---|
| 8,666,904 | B2 * | 3/2014 | Pravetz | G06Q 10/00 705/79 |
| 9,191,382 | B1 * | 11/2015 | Hornung | H04L 63/08 |
| 2007/0061590 | A1 * | 3/2007 | Boye | G06F 21/305 713/186 |
| 2009/0183008 | A1 * | 7/2009 | Jobmann | G06F 21/34 235/382 |
| 2018/0375863 | A1 * | 12/2018 | Fan | G06F 21/31 |
| 2023/0224712 | A1 * | 7/2023 | Lim | H04W 12/06 726/4 |

OTHER PUBLICATIONS

International Search Report and Written Opinion on PCT Appl. No. PCT/US2026/023787 mailed on May 21, 2026.

* cited by examiner

SYSTEMS AND METHODS FOR IDENTITY VERIFICATION VIA THIRD-PARTY DIGITAL IDENTITY SERVICE

INTRODUCTION

This application is generally directed to authentication including systems and methods for third-party authentication services.

Users may access various resources on a client or client device. Some resources may be protected such that, for a user to obtain access to the resource, the user may be authenticated. Such implementations may ensure the security of such resources by limiting or prohibiting unintended access or leakage.

SUMMARY

At least one aspect of the present disclosure is directed to a method. The method may include receiving, by an authentication server from a client device, at least one first data packet. The first data packet may include i) image data corresponding to a biometric image captured during an authentication process and ii) an identifier identifying a resource server. The at least one first data packet may be received in connection with a first request for authenticating the user to access a resource of the resource server. The method may include receiving, by an authentication server from an identity provider, at least one second data packet. The at least one second data packet may include identity data corresponding to a digital identity document of the user. The digital identity document may include an image of the user. The method may include verifying, by the authentication server, an authenticity of the digital identity document, based on information included in the at least one second data packet. The method may include comparing, by the authentication server, the image data of the at least one first data packet and the identity data of the at least one second data packet. The method may include transmitting, by the authentication server using the identifier included in the at least one first data packet, authentication information user to the resource server. The authentication information may be transmitted based on the comparison and the authenticity of the digital identity document.

In some embodiments, the digital identity document originates from the identity provider which is separate from the client device and the second server. In some embodiments, a second request causes the identity provider to transmit a notification to a registered client device. The registered client device includes at least one of the client device or a second client device. The identity provider may identify the registered client device based on an association of the registered client device with the digital identity document. The notification may request the user to grant authorization to the identity provider to transmit the digital identity document to the authentication server. The at least one second data packet is received responsive to authorization from the registered client device. In some embodiments, the notification includes a one-time password (OTP) notification. In some embodiments, the information for verifying the authenticity of the digital identity document includes self-attestation information. The self-attestation information may indicate a source of the digital identity document as the identity provider. In some embodiments, verifying the authenticity of the digital identity document is responsive to a presence of the self-attestation information in the at least one second data packet.

In some embodiments, the digital identity document is stored locally on the client device. The identity provider may include a digital wallet. In some embodiments, the information included in the at least one data packet includes first information. Verifying the authenticity of the digital identity document may include determining, by the authentication server, the first information generated by a source system using a private key for the digital identity document. Verifying the authenticity of the digital identity document may include determining, by the authentication server, second information for the digital identity document, using a public key corresponding to the private key. Verifying the authenticity of the digital identity document may include comparing, by the authentication server, the first information and the second information. The authenticity of the digital identity document may be verified responsive to a match between the first information and the second information. In some embodiments, the digital identity document is stored at the identity provider. Receiving the one or more second data packets may be responsive to an application program interface (API) call to the identity provider. In some embodiments, the method includes storing, by the authentication server, in one or more data structures, an association between an authentication profile established for the user and at least one of the image of the user from the digital identity document or the biometric image. Storing the association may be responsive to the comparison between the image of the user and the biometric image satisfying the match criterion and the authenticity of the digital identity document being verified. In some embodiments, the first request is received responsive to at least one of an initial request from the resource server, or an attempt to access the resource via at least one of the client device or a second client device. In some embodiments, the method includes transmitting, by the authentication server, to the client device, a prompt to trigger capturing of the biometric image, responsive to the initial request or the attempt to access the resource. The at least one first data packet may be received responsive to the prompt. In some embodiments, the authentication information indicates successful authentication of the user, responsive to the comparison satisfying a match criterion and the authenticity of the digital identity document being verified.

At least one aspect of the present disclosure is directed to an authentication server. The authentication server may include at least one processor. The at least one processor may be configured to receive, from a client device, at least one first data packet. The at least one first data packet may include i) image data corresponding to a biometric image captured during an authentication process and ii) an identifier identifying a resource server. The at least one first data packet may be received in connection with a first request for authenticating the user to access a resource of the resource server. The at least one processor may be configured to receive, from an identity provider, at least one second data packet including identity data corresponding to a digital identity document of the user. The digital identity document may include an image of the user. The at least one processor may be configured to verify an authenticity of the digital identity document, based on information included in the at least one second data packet. The at least one processor may be configured to compare the image data of the at least one first data packet and the identity data of the at least one second data packet. The at least one processor may be configured to transmit, using the identifier included in the at least one first data packet, authentication information of the user to the resource server, based on the comparison and the authenticity of the digital identity document.

In some embodiments, the digital identity document originates from the identity provider which is separate from the client device and the second server. In some embodiments, a second request causes the identity provider to transmit a notification to a registered client device. The registered client device may include at least one of the client device or a second client device. The identity provider may identify the registered client device based on an association of the registered client device with the digital identity document. The notification may request the user to grant authorization to the identity provider to transmit the digital identity document to the authentication server. The at least one second data packet may be received responsive to authorization from the registered client device. In some embodiments, the information for verifying the authenticity of the digital identity document comprises self-attestation information which indicates a source of the digital identity document as the identity provider. In some embodiments, the digital identity document is at least one of stored locally in a digital wallet of the client device and obtained by the client device from a source system, or obtained via an application program interface (API) call from the source system. In some embodiments, the information included in the at least one data packet comprises first information. To verify the authenticity of the digital identity document, the at least one processor may be configured to determine the first information generated by the source system using a private key for the digital identity document. The at least one processor may be configured to determine, by the authentication server, second information for the digital identity document, using a public key corresponding to the private key. The at least one processor may be configured to compare, by the authentication server, the first information and the second information. The authenticity of the digital identity document may be verified responsive to a match between the first information and the second information.

At least one aspect of the present disclosure is directed to a non-transitory computer readable medium storing instructions that, when executed by one or more processors of an authentication server, cause the one or more processors to receive, from a client device, at least one first data packet including i) image data corresponding to a biometric image captured during an authentication process and ii) an identifier identifying a resource server. The at least one first data packet may be received in connection with a first request for authenticating the user to access a resource of the resource server. The instructions may cause the one or more processors to receive, from an identity provider, at least one second data packet including identity data corresponding to a digital identity document of the user, the digital identity document including an image of the user. The instructions may cause the one or more processors to verify an authenticity of the digital identity document, based on information included in the at least one second data packet. The instructions may cause the one or more processors to transmit, using the identifier included in the at least one first data packet, authentication information of the user to the resource server, based on the comparison and the authenticity of the digital identity document.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
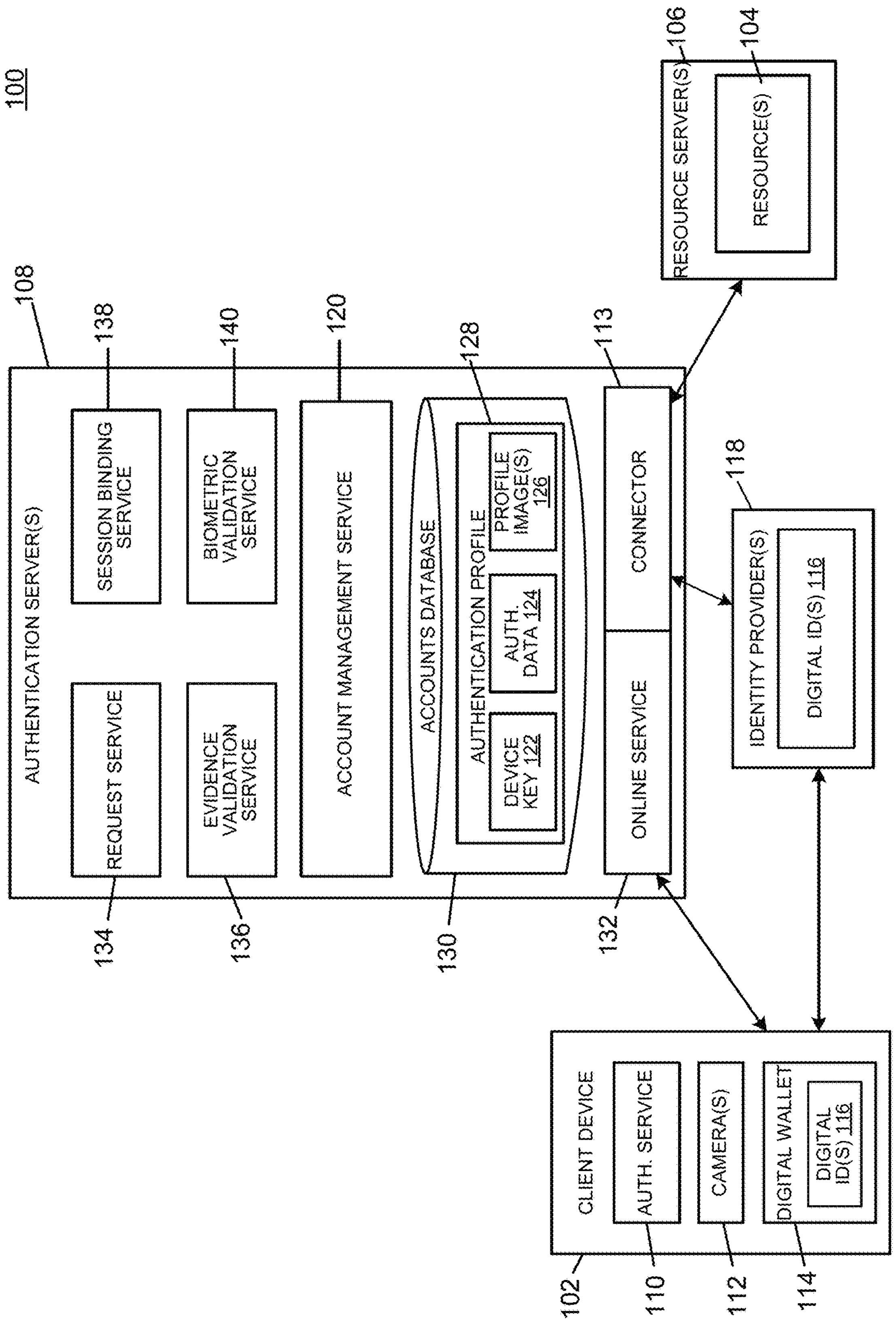
FIG. 1 is a block diagram of a server for authentication, according to an example implementation of the present disclosure.

Following below are more detailed descriptions of various concepts related to, and implementations of, methods, apparatuses, and systems of FIG. 1-FIG. 12. The various concepts introduced above and discussed in greater detail below may be implemented in any of numerous ways.

Existing authentication services often rely on credentials supplied by a user of a device for access rights to a given source. However, current solutions for authentication using third-party identity issuer systems may be vulnerable to credential interception by an untrusted user. Such authentication services are typically enabled to prove the user's possession of a device which is registered for a third-party identity issuer system. However, an untrusted user having possession of the device associated with a certain authentication profile may be able to spoof as the true device owner, given the untrusted user is also able to successfully pass additional basic security measured employed by the authentication service, such as a PIN or a one-time password.

According to the systems and methods described herein, an authentication server may maintain an authentication profile for each user. In particular, the user may generate the authentication profile using an authentication service executing on the device. The authentication service may communicate with a trusted source (e.g., a third-party government identity issuer system) to retrieve identity data (e.g., a digital ID) associated with the device user. The authentication service may be enabled to validate the digital ID with various cryptographic methods, based on the source of the digital ID. A user may be authenticated based on a comparison between the validated digital ID and a second form of identity evidence, such as a biometric image received from the user's device at the time that the authentication request is made. Such implementations and embodiments may be impervious to interception or incorrect authorization by an untrusted user, since the identity evidence used for user authentication is sourced from a reliable third-party provider, is further validated by the authentication server, and once validated, compared to a biometric image received by the user in real-time. Further, the burden on the user during authentication is significantly reduced, as such implementations and embodiments reduce the requirement for users to readily provide identification documents at the time they are requesting a service.

Where authentication includes a comparison of a biometric image to a known user image (such as in facial recognition systems), the biometric image may originate from any source outside of a device. For example, a third-party may intercept or otherwise use an image of a user, in an attempt to impersonate the user for authenticating to a resource. The third-party may upload the image, capture an image of the image, etc. According to the systems and methods described herein, the authentication service may control a hardware camera of the device for capturing biometric images of users attempting to authenticate. The authentication service may digitally sign or otherwise attest to the biometric image as captured by the hardware camera. When the authentication server receives a biometric image, the authentication server may check for the digital signature of the authentication service, thus confirming that the image is not originating from a third-party. Further, the authentication server may use additional data (such as depth map data appended to the image by the camera or authentication service) to confirm that the image is not an image of an image itself, and is rather a live image. Such implementations and embodiments may prevent image swapping for authentication purposes, by ensuring that the biometric images used for authentication purposes are captured in real-time (e.g., during the session between the authentication server and authentication service) and are biometric images of live users (and not an image of an image).

Additional improvements over other authentication services are described in greater detail below.

For purposes of reading the description of the various embodiments below, the following descriptions of the sections of the specification and their respective contents may be helpful:

Section 1. Systems and Methods for Identity Verification via Third-Party Digital Identity Service Section 2. Machine Learning and Artificial Intelligence Systems.

Section 3. Computer Architecture.

1. Systems and Methods for Identity Verification Via Third-Party Digital Identity Service Referring to FIG. 1, depicted is a block diagram of a system 100, which can be used for authentication. In general, a user operating a client device 102 may attempt to access a resource 104 hosted on a resource server 106. As part of resource access rights, the resource server 106 may request the user authenticate with the resource 104 prior to the user being permitted access to the resource 104. In various implementations, users may authenticate with a resource 104 through various authentication mechanisms, such as a username and password, a one-time pass code, through voice, text message, email authentication, dual-factor or multi-factor authentication, or any other authentication method or combination of authentication methods. However, some of such authentication mechanisms may be cumbersome on users, may have security risks associated therewith, and may not provide a level of authenticity that is satisfactory for access rights to a given resource. Additionally, because identities and personally identifiable information (PII) of a user can change over time (e.g., through name change, email address changes, aging or face augmentation, and so forth), such systems may not have persistence.

According to the embodiments described herein, the system 100 may include one or more authentication server (s) 108, which operate within an authentication service 110 executing on the client device 102. Together, the authentication server(s) 108 and/or authentication service 110 may be configured to share validated authentication information and identity assurance about user(s) of the client device 102 with the resource server(s) 106 upon receipt of the user's consent. In some embodiments, identity information required for user authentication may be received by an external identity provider, such as a third-party identity issuer system. In particular, and as described in greater detail below in section 1(A), the authentication service 110 may be configured to receive, capture or otherwise obtain authentication information or data used to authenticate users of the client device 102 (e.g., via a digital wallet 114 of the client device 102, an external identity provider 118, etc.). The authentication server(s) 108 may be configured to verify the authentication data, provided by the identity provider (e.g., using cryptographic analysis), and compare the authentication data from the authentication service 110 with a biometric image captured on the user device (e.g., via the camera(s) 112). While described herein with reference to initial access rights, according to various implementations, the systems and methods described herein may also be implemented for account recovery (e.g., using established authorization profiles and validated identity data to authenticate a user on a new device, etc.).

The authentication server(s) 108 may include one or more connectors 113 and/or embeddable components or authentication protocol implementations to connect the authentication server(s) 108 to the resource server(s) 106. In some embodiments, where the identity provider(s) are separate from the client device 102 and the authentication server(s) 108 (e.g., the external identity provider(s) 118), the connectors 113 may connect the authentication server(s) to the external identity provider(s) 118. To provide authentication of users, the authentication service 110 may be configured to collect, obtain, or otherwise receive data packets or requests including authentication data from the user (e.g., a biometric image), and provide the received biometric to the authentication server 108. Additionally, the authentication service 110 may be configured to collect, obtain, or otherwise receive data packets or requests including identity data from an identity provider (e.g., the external identity provider(s) 118 or the digital wallet 114 on the client device 102), and provide the identity data to the authentication server 108. As described in section 1(C), the authentication server 108 may be configured to validate the data received from the user and the identity provider(s). The authentication server(s) 108 may be configured to transmit, send, or otherwise provide the validated information with the resource 104 responsive to receiving or otherwise determining that the user consents to sharing the validated information.

Figure 6:
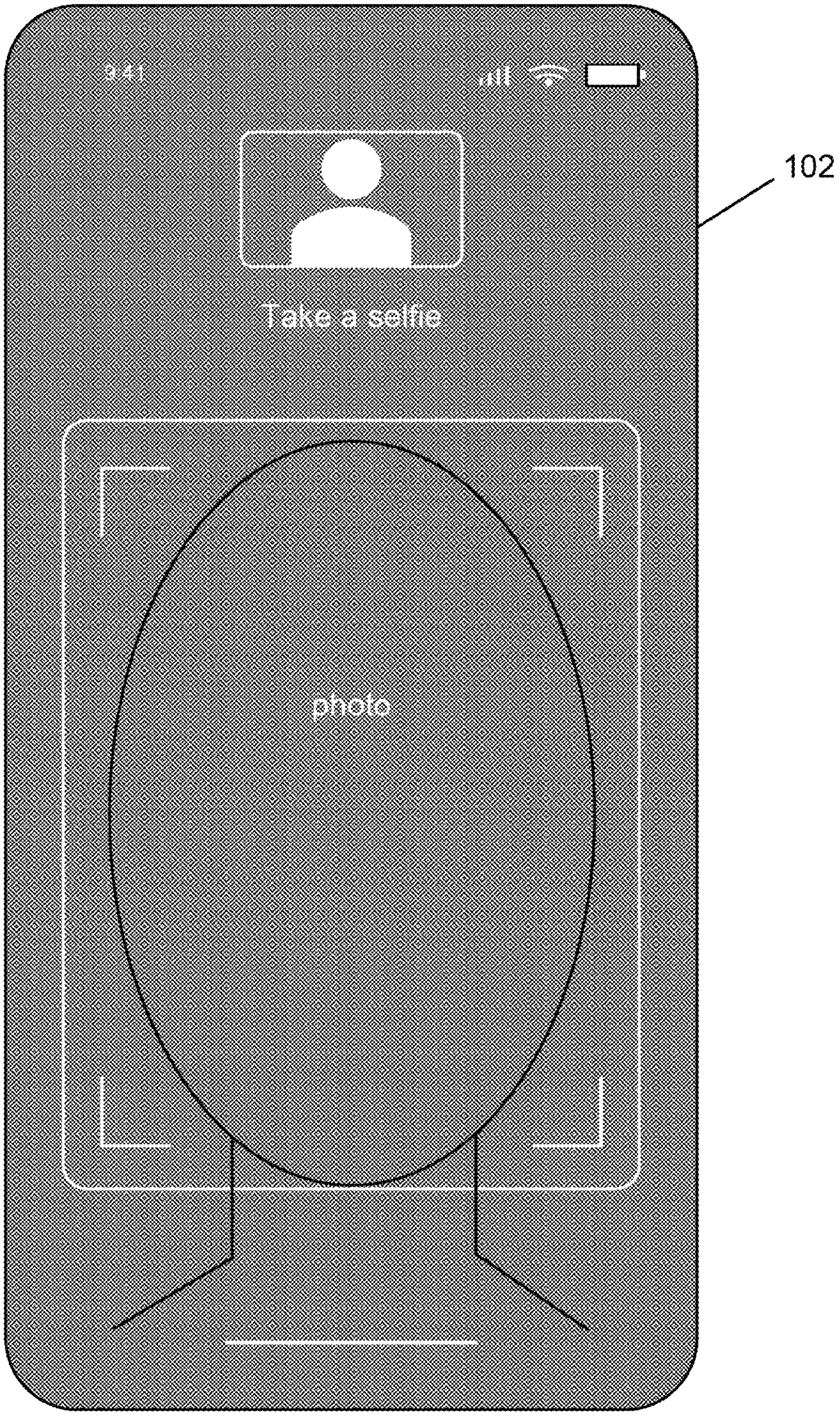
FIG. 6 is a view of a user interface of the client device of FIG. 4 for capturing a biometric image of a user, according to an example implementation of the present disclosure.
Figure 7:
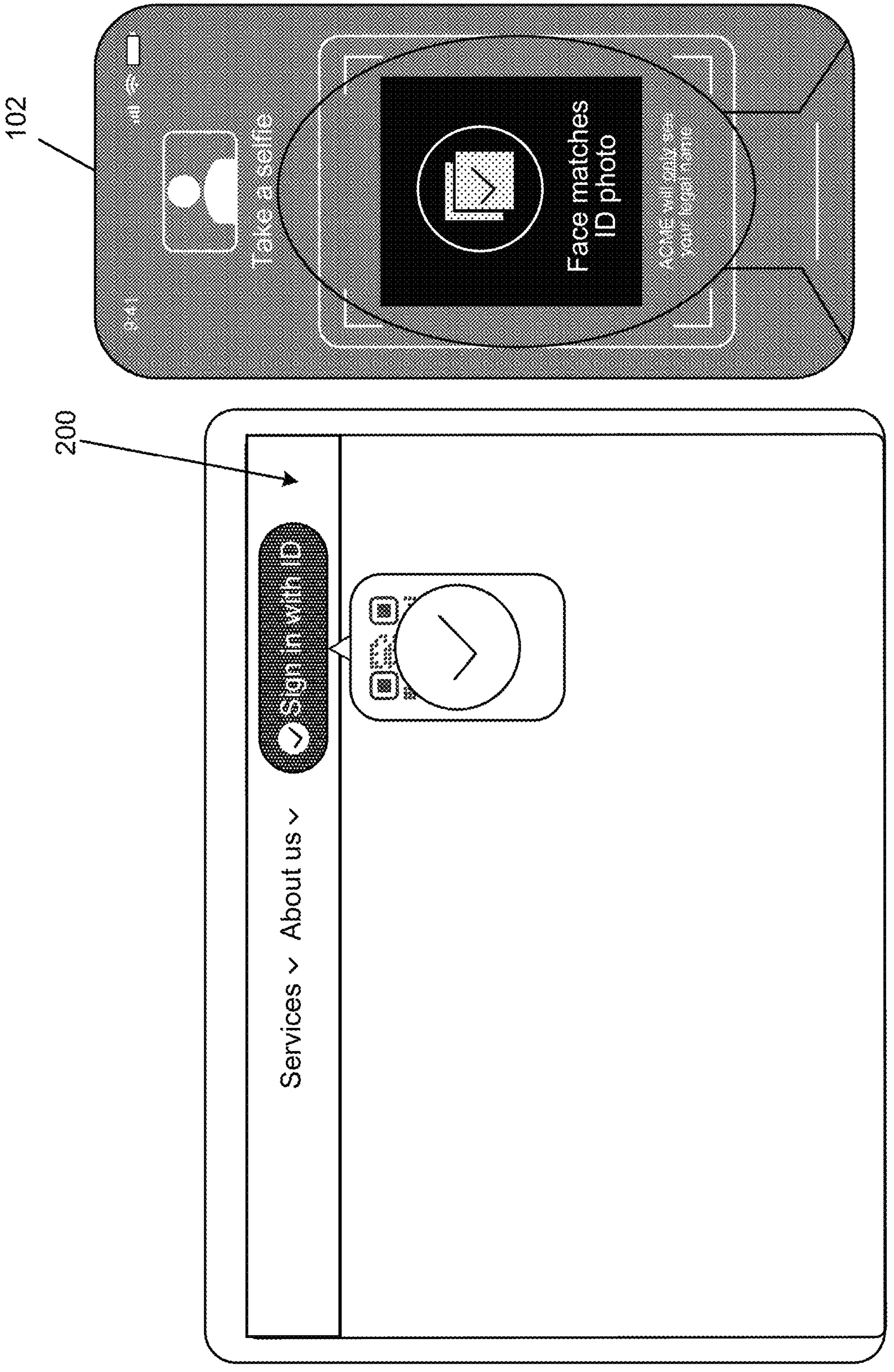
FIG. 7 is a view of the user interface of FIG. 2 and the client device of FIG. 4 following authentication of the user, according to an example implementation of the present disclosure.
Figure 8A:
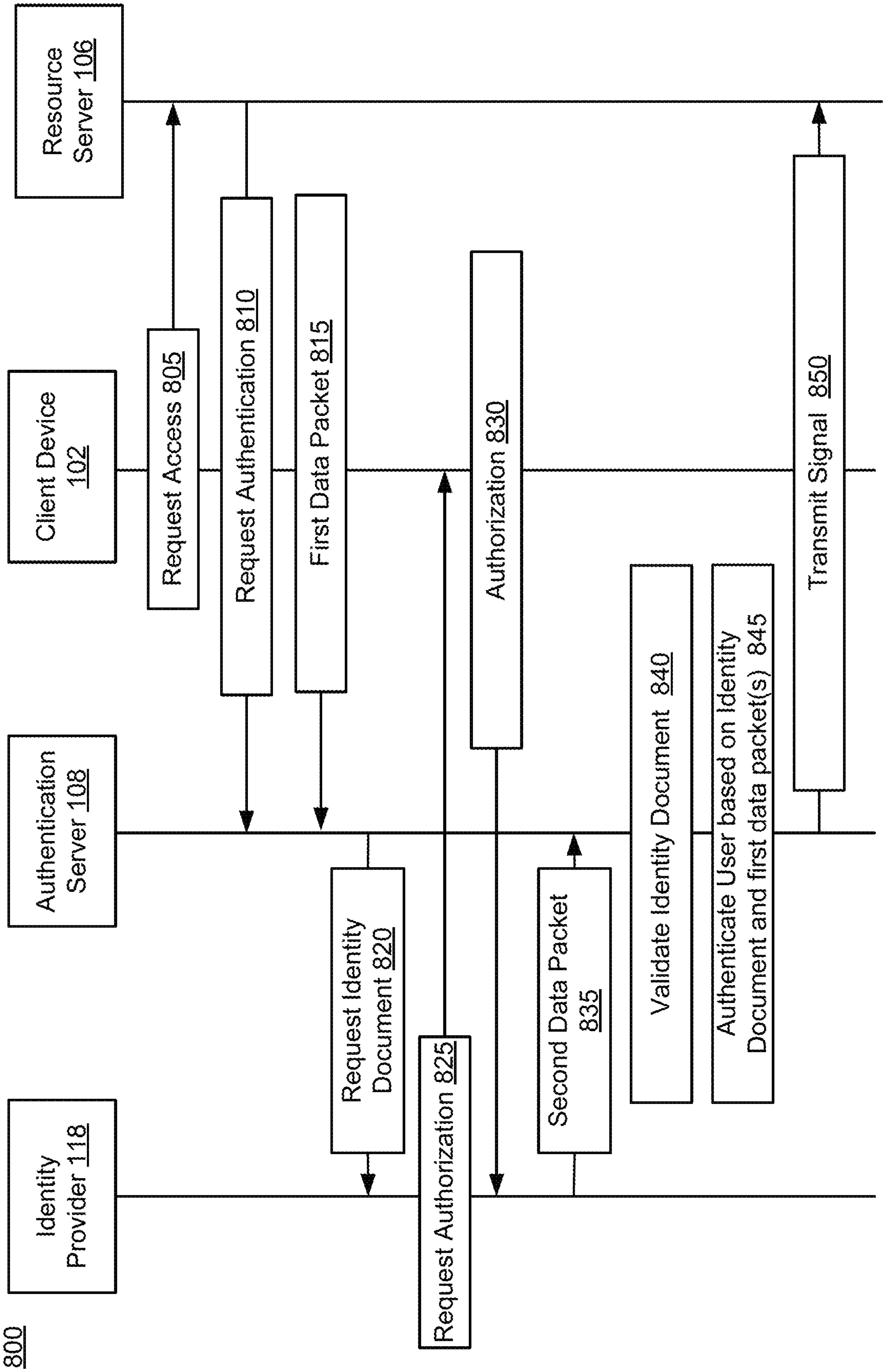
FIG. 8A is a view of a process flow showing a method for user identity verification, according to an example implementation of the present disclosure.
Figure 8B:
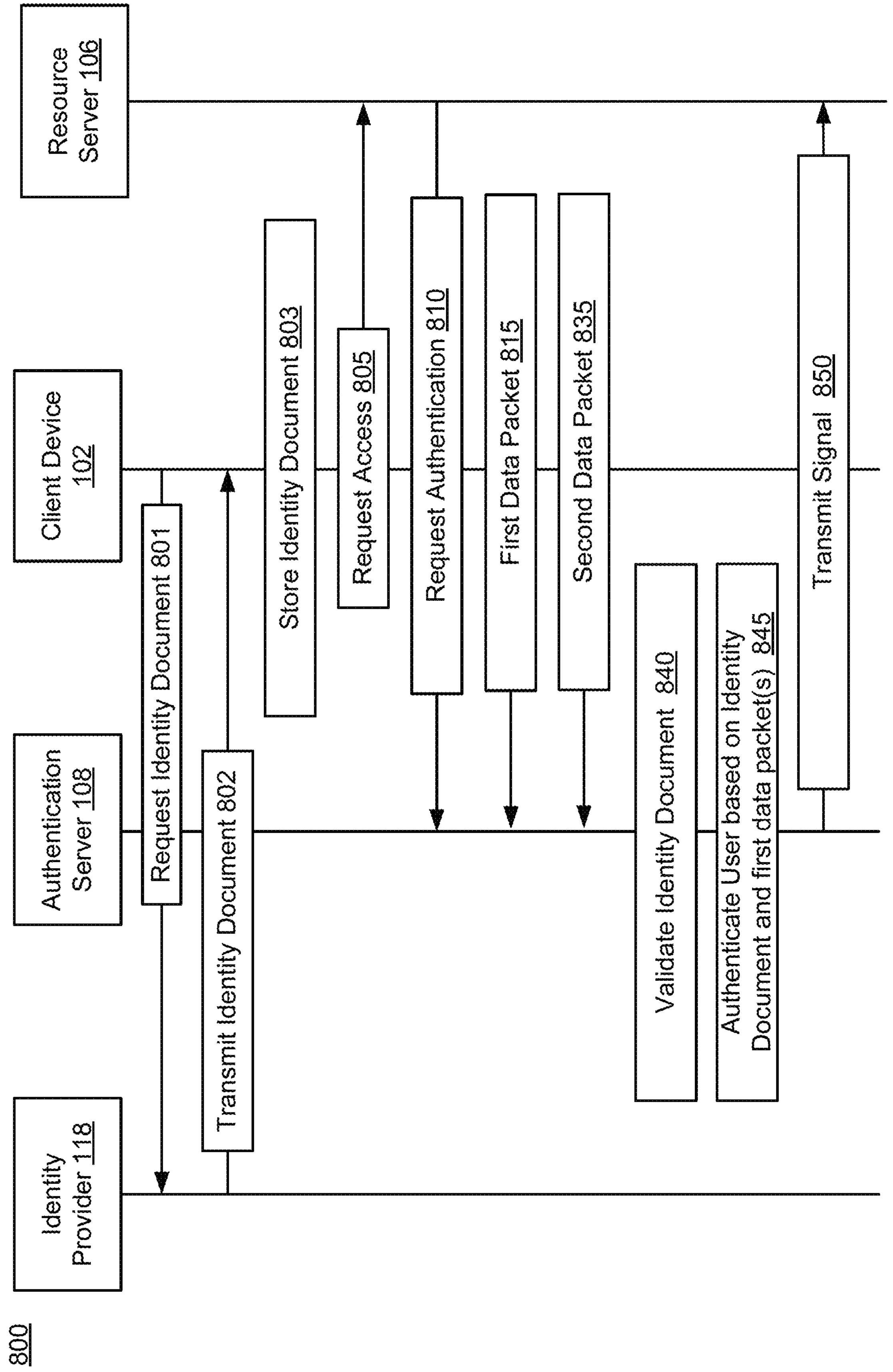
FIG. 8B is a view of a process flow showing a method for user identity verification, according to another example implementation of the present disclosure.

Implementations of the identity verification process are described further herein, with reference to FIGS. 1-7. Additionally, FIGS. 8A and 8B illustrate the process flow 800 showing the method for identity verification using a third-party identity service. In particular, FIG. 8A depicts an implementation of the process flow 800, where digital identity data is retrieved from the external identity provider 118 in response to an authentication request. Conversely, FIG. 8B depicts an implementation of the process flow 800 where the digital identity data required for authentication is stored locally on the client device 102.

A. Initiating a Request

Figure 2:
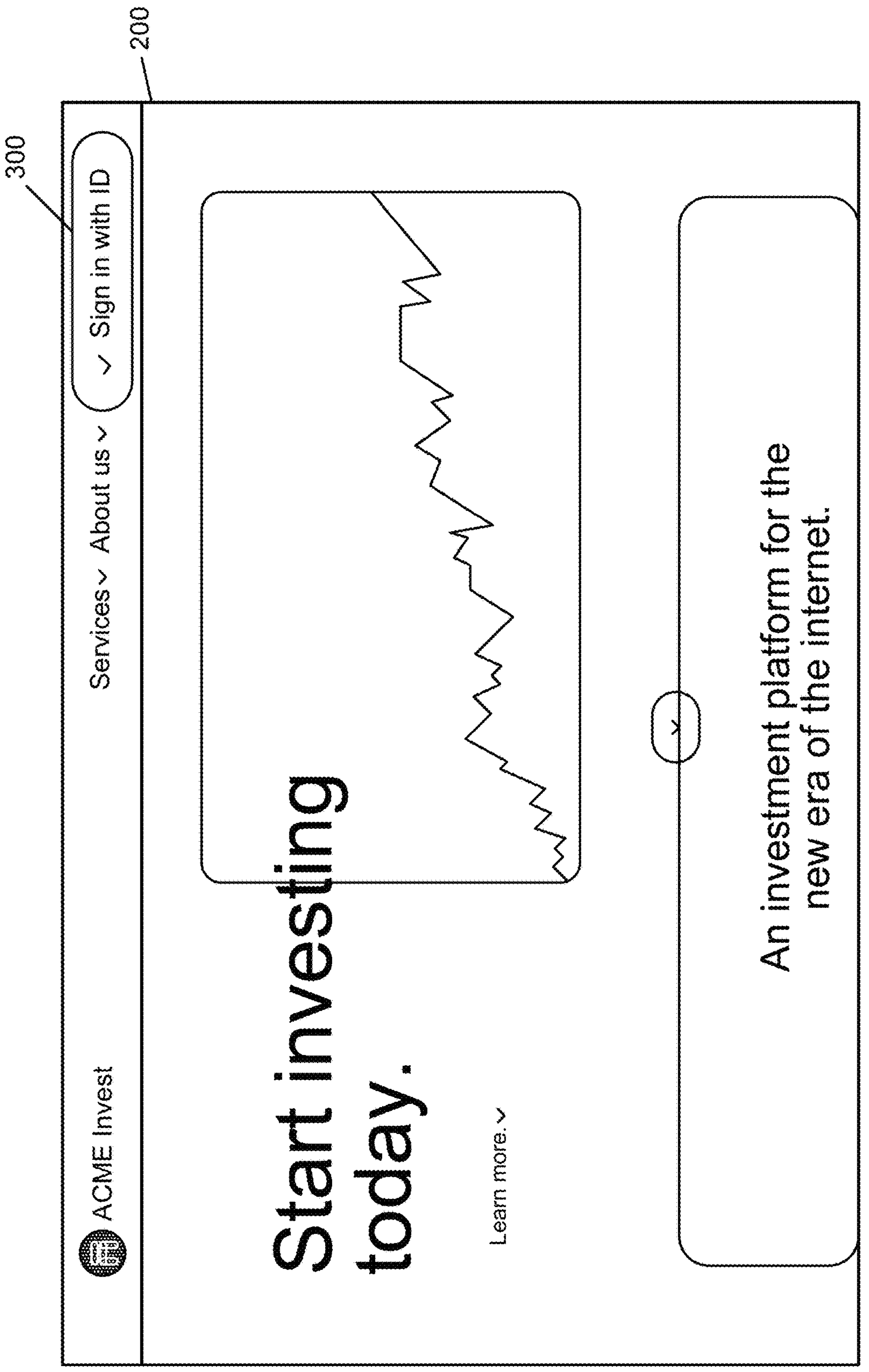
FIG. 2 is a view of a user interface of a resource hosted on a resource server, according to an example implementation of the present disclosure.

Referring now to FIG. 1 and FIG. 2, with continued reference to FIGS. 8A and 8B, a user of the client device 102 may navigate to a webpage corresponding to a resource 104 hosted on the resource server 106. Specifically, FIG. 2 shows a user interface 200 of a resource, according to an example implementation of the present disclosure. The resource 104 may be or include any resource 104, including but not limited to websites, webpages, applications, or any other internet-based resource. The resource 104 may be a protect resource such that, to obtain access to one or more functionalities, features, or pages of the resource 104, the resource 104 may request that the user provide authentication information to authenticate to the resource 104. As shown in FIGS. 8A and 8B, action 805 involves transmission of a signal from the client device 102 to the resource server 106, which serves to request access by the client device 102 to the resource 104 hosted on the resource server 106. Such a signal may be triggered or otherwise received in response to an attempt to access the resource 104 (e.g., selecting "Sign in with ID" user interface element 300). In some implementations, the signal may originate from the resource server 106 hosting the resource 104 (e.g., responsive to the user selecting the user interface element 300).

To obtain access to the resource 104, the resource 104 may generate, create, or otherwise establish a session between the client device 102 and the resource server 106. The resource server 106 may be configured to issue a request to the client device 102 to authenticate via the authentication server 108, shown as action 810 in FIGS. 8A and 8B. The resource server 106 may be configured to issue the request using a library provided by the authentication server(s) 108, by a third-party authentication library (such as OAuth 2.0), or some other library. The resource server 106 may be configured to bind the request to the session established between the client device 102 and server 108 (e.g., by incorporating a session identifier in a request to the authentication server 108 for the user to authenticate themselves), which ensures that the user proving their identity is the same as the user that initiated the transaction with the resource server 106.

Figure 3:
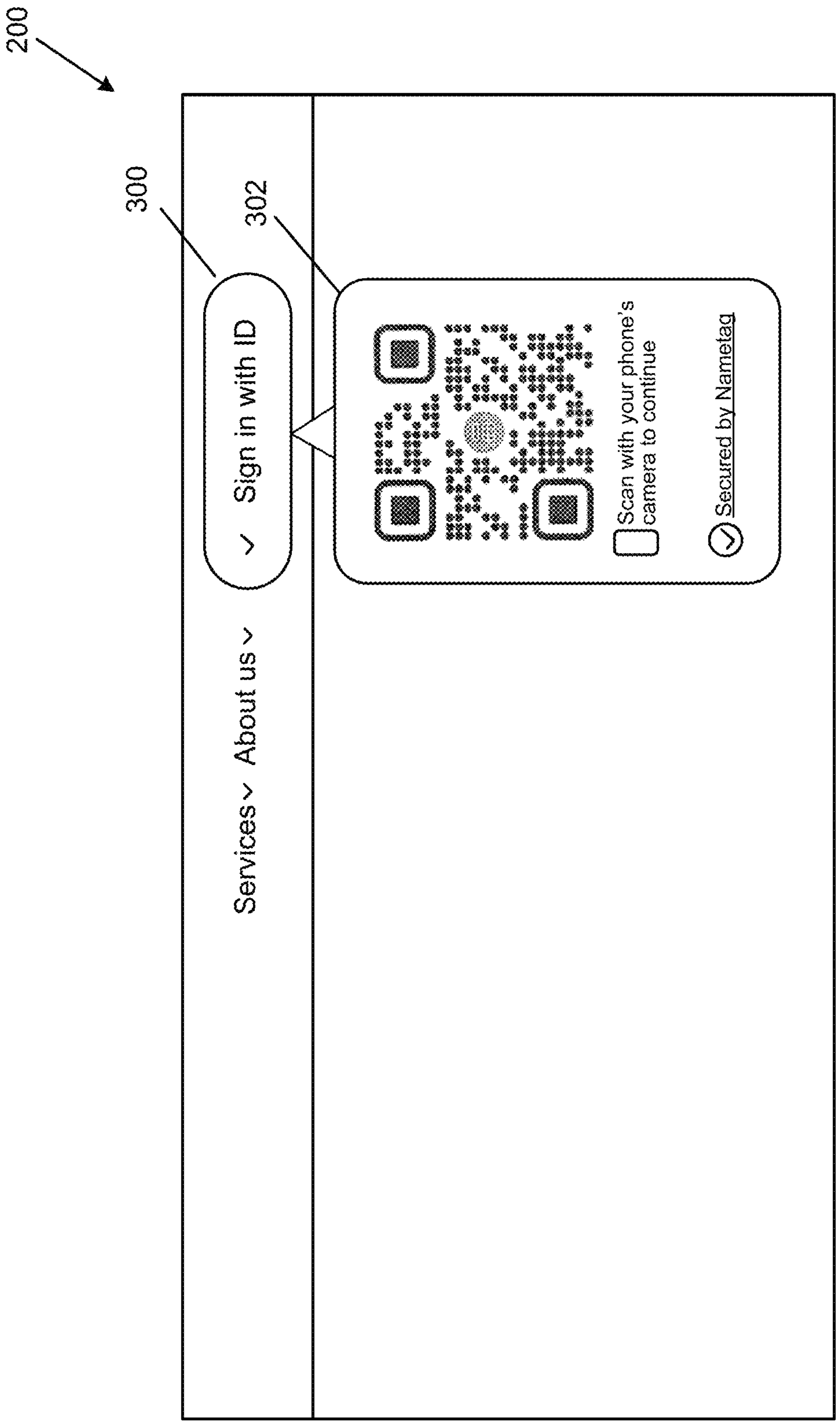
FIG. 3 is a view of a user interface element for initiating authentication on the user interface of FIG. 2, according to an example implementation of the present disclosure.
Figure 4:
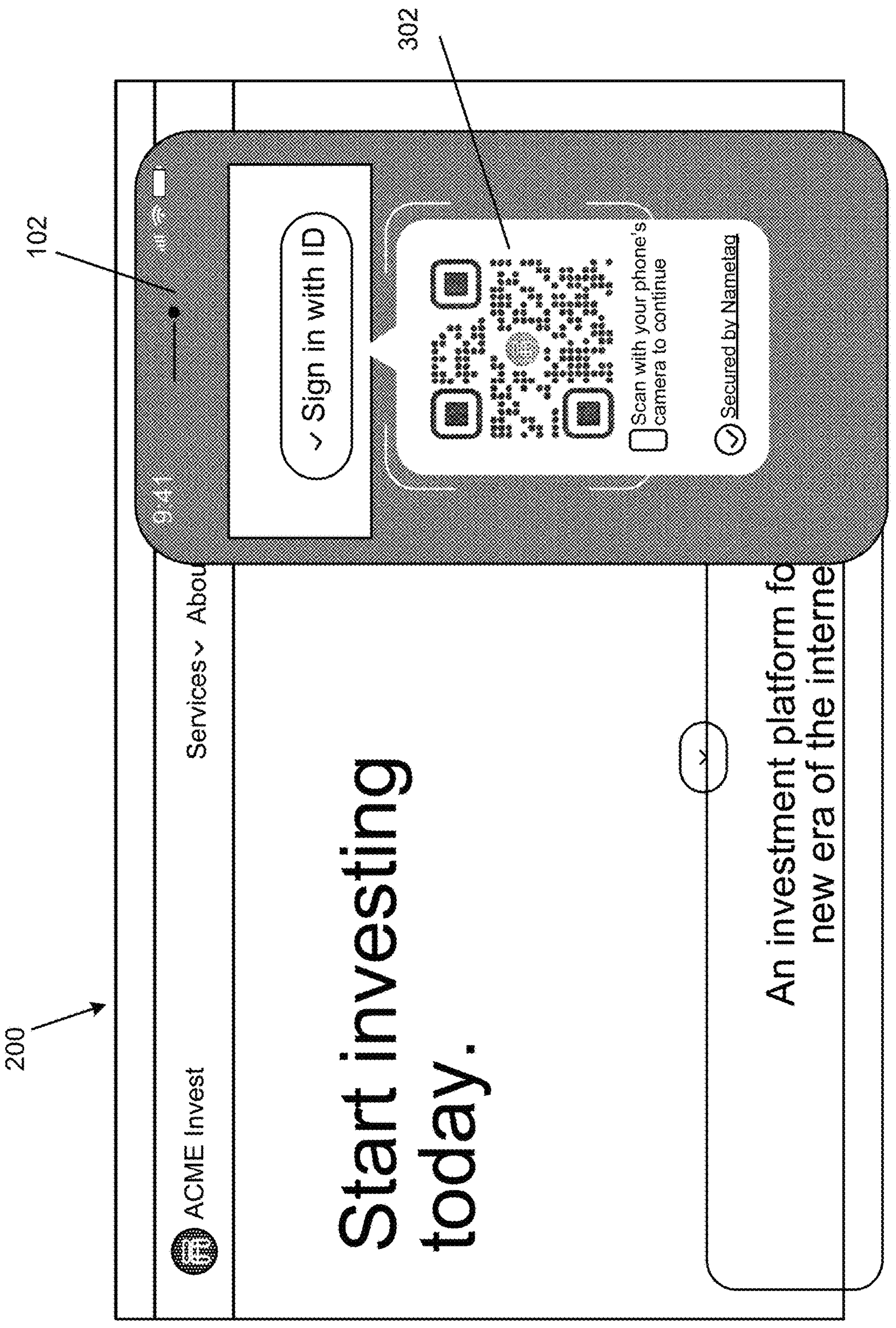
FIG. 4 is a view of a client device interfacing with the user interface element of FIG. 3, according to an example implementation of the present disclosure.

As shown in FIG. 3, to initiate authentication and/or request authentication to the authentication server 108, resource 104 may be configured to direct the user to a uniform resource locator (URL) corresponding to the request (e.g., a request URL). The resource 104 may direct the user to the URL by displaying a quick response code with is encoded to direct the client device to the URL (or automatically launch the URL) upon scanning the quick response code. Specifically, FIG. 3 shows a view of a user interface element 300 for initiating authentication on the user interface 200, according to an example implementation of the present disclosure. As shown in FIG. 3, the resource 104 may include a user interface element 300, which may be or include button or toggle, which launches display of a quick response (QR) code 302. In some embodiments, the user may be directed to the request URL through or by way of a text message, a near-field communication (NFC) tag, a hyperlink, or some other manner of directly or indirectly launching the request URL on the client device. As shown in FIG. 4, where the QR code 302 is displayed, the user of the client device 102 may be configured to scan (e.g., using the camera(s) 112) the QR code 302 shown on the user interface 200. Upon the user operating a camera 112 of the device 102 to scan the QR code 302, the client device 102 may be directed to the request URL, which is encoded in or otherwise associated with the QR code 302.

Figure 5:
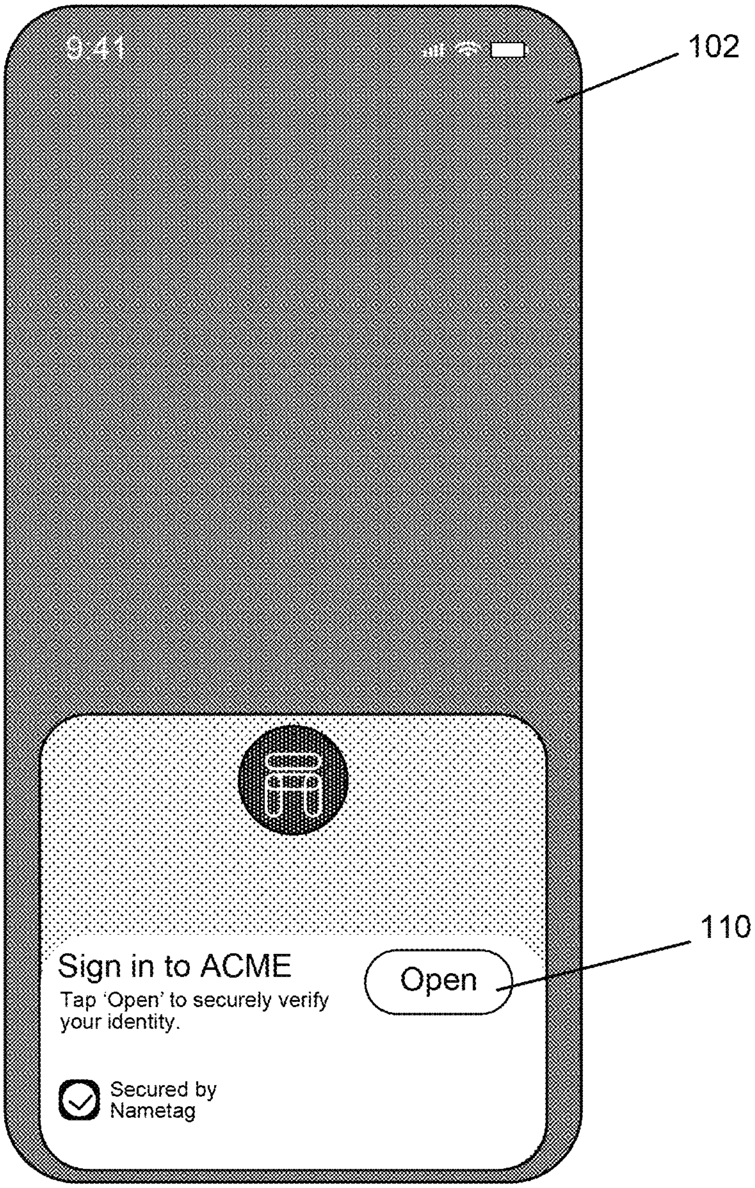
FIG. 5 is a view of a user interface of the client device of FIG. 4, according to an example implementation of the present disclosure.

As shown in FIG. 5, when the client device 102 is directed to the request URL, the authentication service 110 may be configured to launch on the client device 102. The authentication service 110 may be or include an application deployed or otherwise installed on the client device 102, an over-the-air (OTA) installed version of the application (e.g., a miniature version of the application, such as an APPLE App Clip, an ANDROID Instant App, etc.), and the like. For example, where a native application version of the authentication service 110 is not installed on the client device 102, when a user of the client device 102 launches the request URL (e.g., by scanning the QR code), a server receiving a domain name service (DNS) request for the request URL may re-direct to launch the OTA-installed version of the application. The authentication service 110 may be deployed on the client device 102 while the initial URL that represents the request (e.g., between the client device 102 and resource server 106) is preserved.

As shown in FIG. 6, to collect the user evidence, the authentication service 110 may be configured to activate the camera(s) 112 of the client device 102 to obtain, capture, or otherwise receive a facial image of the user. For certain images, for example when taking a facial image (also referred to as a "biometric image" of the person holding the client device 102), the authentication service 110 may be configured to use face detection to ensure that the face is fully within the frame, that it is oriented directly at the camera 112, and that all required facial features (eyes, nose, mouth) are detected. On client devices 102 that support capturing of depth map or data with images, the authentication service 110 may be configured to augment an image with a depth map, which provides a three-dimensional image of the object being captured. If the image is not accepted, the authentication service 110 may be configured to determine the reason for rejection and displays a hint to the user ("too dark", "face not in frame", etc.) that guides the individual to capture an acceptable biometric image. The client device 102 may then transmit the biometric image to the authentication server 108 in a first data packet, shown as action 815 in FIGS. 8A and 8B. In some embodiments, the first data packet includes an identifier identifying the resource server 106 (e.g., a code, one time password, etc. provided by the resource 104 and entered by the user on the client device 102).

B. Processing the Request

Upon initial launch, the authentication service 110 may be configured to use cryptographic hardware or components of the client device 102 to establish a cryptographic public/private key pair. The public-private key or key pair may uniquely identify or otherwise be associated with the client device 102 ("device key"). This key pair is configured to be unexportable, meaning it is bound to or otherwise uniquely associated with the particular client device 102. The authentication service 110 executing on the client device 102 may be configured to transmit, send, or otherwise provide the device key (e.g., the public key of the key pair) to the authentication server 108. An account management service 120 of the authentication service 110 may be configured to receive the device key from the authentication service 110 as part of generating an authentication profile 128 for the user of the client device 102. As described in greater detail below, the account management service 120 may be configured to store the device key 122 in association with authentication data 124 in an accounts database 130 or some other data structure maintained or accessible by the authentication server 108.

The authentication service 110 may be configured to inform, indicate, instruct, or otherwise identify (e.g., to an online service 132 of the authentication server 108) that the authentication service 110 is performing, handling, or otherwise initiating providing authentication that corresponds to the request URL (e.g., specified or indicated by the QR code 302). The online service 132 may indicate, e.g., to a request service 134, that the authentication service 110 on the client device 102 is being used to authenticate the user for the request URL. The request service 134 may maintain the session identifiers associated with each request URL. The session binding service 138 may be configured to bind the request URL to the device key of the client device 102, which is executing the authentication service 110, thus ensuring that only one device can handle a request.

An evidence validation service 136 may be configured to determine the identity evidence needed for satisfying the authentication request to the resource server 106. Identity evidence, as used herein, refers to information, data, or the like, corresponding to a digital identity document of the user (e.g., identity evidence). The identity evidence may be used for comparison to authentication data 124 received as part of the authentication process, or, in some instances, stored in the authentication profile 128 for the user. For example, the identity evidence may include a digital ID 116, which may be compared with a biometric image of the user. The evidence validation service 136 may be configured to determine the evidence needed for satisfying the request based on data from the request URL. For example, the request URL may include or identify particular types of data needed for authenticating the user. Additionally or alternatively, the evidence validation service 136 may be configured to determine the evidence needed for satisfying the request by requesting such information from the resource (e.g., through one or more application program interface (API) calls). The evidence validation service 136 may be configured to determine current or existing authentication data 124 stored in the authentication profile 128 and provided by the user. For example, the authentication data 124 may be indexed according to a type or category of authentication data 124, along with flags indicating whether each entry of the authentication data 124 has been validated. The evidence validation service 136 may be configured to determine, based on the specific information provided and stored in the authentication profile 128, if the individual has already provided enough evidence to satisfy the request, and if that evidence has been validated.

The evidence validation service 136 may be configured to determine which types of evidence are to be used in satisfaction of the request. For example, the evidence validation service 136 may be configured to obtain, capture, or otherwise receive the identity evidence from an external identity provider 118 (e.g., a government digital ID system that is configured to issue digital identity documents or credentials). For example, as shown in FIG. 8A, the authentication server 108 may request a digital ID 116 from the appropriate external identity provider 118 (e.g., through an API call), shown as action 820. Responsive to the API call, the external identity provider 118 transmits a notification to the client device 102 to request the user to grant authorization to the external identity provider 118 to transmit the digital ID 116 to the authentication server 108 (e.g., a one-time password (OTP) notification, or the like). This is shown as action 825 in FIG. 8A. The client device 102 may provide a subsequent indication to the identity provider 118, shown as action 830 in FIG. 8A, which gives authentication to the identity provider 118 to share the user's identity data.

In some embodiments, the digital ID 116 may be stored locally on the client device 102 in a digital wallet 114 (e.g., a U.S. mobile driver's license stored in the digital wallet 114). In some embodiments, the digital ID 116 is obtained by the client device 102 responsive to a request to an external identity provider 118. For example, and as shown in FIG. 8B, the client device 102 may transmit a request to the identity provider 118, shown as action 801. Responsive to the request, the external identity provider 118 may transmit the requested digital ID 116 to the client device 102, shown as action 802. The client device 102 may store the digital ID within the client device 102 (e.g., in the digital wallet 114), shown as action 803. The digital ID 116 may be stored into the client device 102 at any time prior to authentication by the authentication server 108. That is, the client device 102 need not store a digital ID 116 into a digital wallet 114 as part of the authentication process. Additionally, the actions 820-830 (as shown in FIG. 8A) need not be performed during the user authentication process when the digital ID 116 is stored locally.

In some embodiments, identity evidence is received from the identity provider 118. For example, responsive to receiving authorization from the user, the identity provider 118 may transmit a second data packet to the authentication server 108, shown as action 835 in FIG. 8A. The second data packet includes the identity data, such as an ID image and name, associated with the digital ID 116. In implementations where the digital ID 116 is stored on the client device 102 (e.g., in a digital wallet of the client device 102), the second data packet is transmitted from the client device 102 to the authentication server 108 (e.g., action 835 in FIG. 8B).

Upon receiving the identity evidence from the external identity provider 118, the authentication server 108 may verify the authenticity the identity data received, shown as action 840 in FIGS. 8A and 8B. In some embodiments, the evidence validation service 136 may be configured to extract the identity evidence (e.g., a photograph from the ID, a name from the ID, validation information, etc.) from the digital ID 116. For example, the external identity provider 118 may provide self-attestation information together with the requested digital ID 116 for the user. The self-attestation information, such as a seal or watermark designating the external identity provider 118, may serve as an indication that the digital ID 116 was indeed retrieved from the external identity provider 118. Upon determination that the self-attestation information is present on the digital identity document 116, the evidence validation service 136 may validate the digital identity document 116, shown as action 840 in FIG. 8A.

In some embodiments, the identity evidence is validated responsive to a comparison using a public-private key pair.

For example, the external identity provider 118 may be configured to generate, configure, or otherwise provide a cryptographic value corresponding to a digital ID 116 generated using a private key of the public-private key pair. The cryptographic value may correspond to certain information relating to the digital ID 116 (e.g., encode or otherwise encrypt, using the private key, the ID holder's name, address, DOB, etc.). The evidence validation service 136 may then obtain a public key from, e.g., the external identity provider 118 and/or the digital wallet 114, where the public key corresponds with the private key used to generate the cryptographic value. The evidence validation service 136 may be configured to use the public key to decrypt/decipher the cryptographic value, and compare the information following decryption to the information from the digital ID 116. For example, the second data packet that includes the digital ID 116 may included a cryptographic value generated using a private key and encoding certain information relating to the digital ID 116 (e.g., name, date of birth, driver's license number, etc.). To verify that the digital ID 116 is legitimate and truly corresponds to the user indicated on the digital ID, the evidence validation service 136 may be configured to use the public key obtained from the external identity provider 118 to decrypt the cryptographic value. When the digital ID 116 is indeed legitimate, the decrypted cryptographic value may include data that encodes the user's correct information, as shown on the display of the ID (e.g., the information including name, date of birth, drivers license, etc. is the same on both the digital ID 116 and the decoded from the cryptographic value). In this instance, the digital ID 116 is validated, shown as action 840 in FIG. 8B.

To confirm that the biometric image (see section 1(A)) captured on the client device 102 is valid, the authentication service 110 may be configured to transmit, send, or otherwise provide the captured biometric image (e.g., along with a depth map in some implementations) to the authentication server 108. In some embodiments, the authentication service 110 may be configured to use platform or operating system features to gather a cryptographic assertion that the image was captured on a genuine client device 102 using a genuine version of the authentication service 110 which was cryptographically signed by authentication service 110. Because the authentication service 110 only captures images from a hardware camera 112 of the client device 102 (e.g., and does not permit uploading or using stored images), this prevents a potential attacker from re-implementing the authentication service 110 to transmit a digitally manipulated image of the evidence to the authentication server 108.

Some systems may use web platforms to capture evidence of identity documents. Because of the nature of the web platform, they accept and account for the risk that the images they receive may have been digitally manipulated. This is because a fraudulent actor could impersonate their web application, or use a virtual camera to give the impression that a picture was taken, when actually a digitally manipulated image was provided. The image processing required to detect these digitally manipulated images is complex and unreliable.

To mitigate this risk, the systems and methods described herein limit capturing of the biometric images to the hardware camera 112 of the client device 102. To gain confidence that the biometric images received by the authentication server 108 are from the client device 102, the authentication service 110 may be configured to use operating system or platform features of the client device 102 to embed a digital attestation that the client device 102 used to capture the biometric image has not been manipulated (e.g., jail broken) and that the authentication service 110 running or executing on the client device 102 has been digitally signed by the authentication service 110 and distributed through an authorized mechanism (e.g., an authorized application store of the client device 102). The authentication server 108 may be configured to independently verify the assertion with the hardware vendor corresponding to the client device 102. Because the authentication service 110 can only be deployed on client devices 102 having a hardware camera 112, the authentication service 110 need not account for the possibility that a fraudulent actor will present digitally manipulated biometric images.

The authentication server 108 may be configured to compare information from the first data packet and the second data packet, shown as action 845 in FIGS. 8A and 8B, to determine whether the current user of the client device 102 is a match with the verified identity data. For example, the evidence validation service 136 may may be configured to compare the validated biometric image against the facial image extracted from the validated digital ID 116, to determine whether the facial features from both images are a match.

As previously mentioned, the systems and methods described herein limit obtaining the identity evidence to secure sources of digital identity documents. To gain confidence that the identity evidence is authentic, the evidence validation service 136 may run various tests, depending on the source of the identity evidence, to confirm that the digital identity document is an authentic or official ID associated with the user.

In some instances, the evidence validation service 136 may analyze the biometric image and the identity evidence in parallel, rather than waiting for all evidence to arrive. By performing the analysis in parallel, the systems and methods described herein may improve the latency of the analysis by performing initial analysis in the background while additional evidence is being requested or obtained. For example, if the user captures a biometric image, the evidence validation service 136 may analyze the biometric image in parallel with the identity information retrieved by an external identity provider 118. As another example, where the external identity provider 118 requires approval from the user to transmit the digital identity document 116 to the authentication server 108, the evidence validation service 136 may analyze the biometric image without waiting for all evidence to be sent by the external identity provider 118.

Once all the evidence is received, and all data extracted successfully, the evidence is marked as validated, and is bound to the particular device key (e.g., by storing the validated data as authentication data 124 in association with the device key 122 in the authentication profile 128). The evidence validation service 136 may be configured to store, update, or otherwise incorporate the data (e.g., as authentication data 124) in an authentication profile 128 for the user which is uniquely associated with the device key 122 for the client device 102. If the evidence cannot be validated by the evidence validation service 136, the evidence validation service 136 may be configured to store the data in the authentication profile 128 with an indicator or other identifier noting that the evidence is not validated, and forward the evidence to an admin device associated with the authentication server 108 for manual review and determination of the disposition of the evidence. Where manual review is provided and the evidence is validated (or invalidated), the feedback can be fed into a machine learning or artificial intelligence system to further improve the fidelity of automated determinations.

C. Completing Authentication

When the request has been completed, the authentication service 110 may be configured to redirect the client device 102 to a completion to URL provided by the resource 104 (e.g. https://example.com/oauth2/callback). The construction of the completion URL may include variables that the resource 104 can use to retrieve the validated data about the user, and bind that user to the initial session established between the user and the resource server 106. In most cases, the session token will be valid at this point, and if it is, then the completion URL attests both to the data and to the session binding. However, if the session token is not valid, or not provided, then the completion URL attests only to the data but not to the session binding.

The mechanism to launch this URL takes different forms depending on the method used to launch the authentication service 110. For example, when the request was initiated by a desktop web browser, the browser may be configured to monitor the status of the request and when it has been completed, the browser receives the completion URL from the authentication service 110, and directs the browser to the completion URL. When the request was initiated on the mobile device, the completion URL may be launched directly by the authentication service 110. In some embodiments, the host of the resource 104 may be configured to register a webhook with the authentication server(s) 108, which provides a server-to-server notification that new validated data have been shared, but which does not provide any session binding. Once the resource(s) 104 receive the validated information, the resource(s) 104 may authenticate the user and permit access of the user to the resource 104 using the validated information (as shown in FIG. 7). After an individual has initially established their identity with the authentication server 108, their underlying demographic data may change. For example, a user may move to a different state and get a new driver license or other identification document. The systems and methods described herein may be configured update the user's demographic data by retrieving a new digital ID associated with the user, but may not permit users to replace their demographic data with that of a different person. In other words, a device key, and all that is derived from it (including any authentication data 124 stored or otherwise linked to an authentication profile 128 associated with the device key 122), should belong to exactly one individual human. There is a class of fraud that involves swapping identities (e.g. back and forth between two different people). Without a way to prevent this, the systems and methods described herein would not be able to ensure or guarantee the identity of the individual.

To ensure that each authentication profile 128 is associated with a particular user (e.g., a singular user), when a user provides a digital ID 116 and biometric image, and when that ID/biometric image pair is successfully validated, the biometric validation service 140 may be configured to append a reference to the biometric image in a permanent list (e.g., as a profile image 126) for that individual. Each time the person takes a new biometric image (e.g., which is subsequently validated), a reference to that biometric image is added to the profile images 126 in the authentication profile 128 for the user. In the event that an individual provides evidence of a new digital ID and biometric image, and that evidence is valid, the biometric validation service 140 may be configured to compare the biometric image and image from the ID to the profile images 126. The biometric validation service 140 may be configured to determine whether at least one profile image 126 in the authentication profile 128 is a biometric match to the biometric image/image from the ID. If the biometric image/image from the ID is not a biometric match to at least one profile image 126, the biometric validation service 140 may be configured to determine that the ID is invalid.

Figure 9:
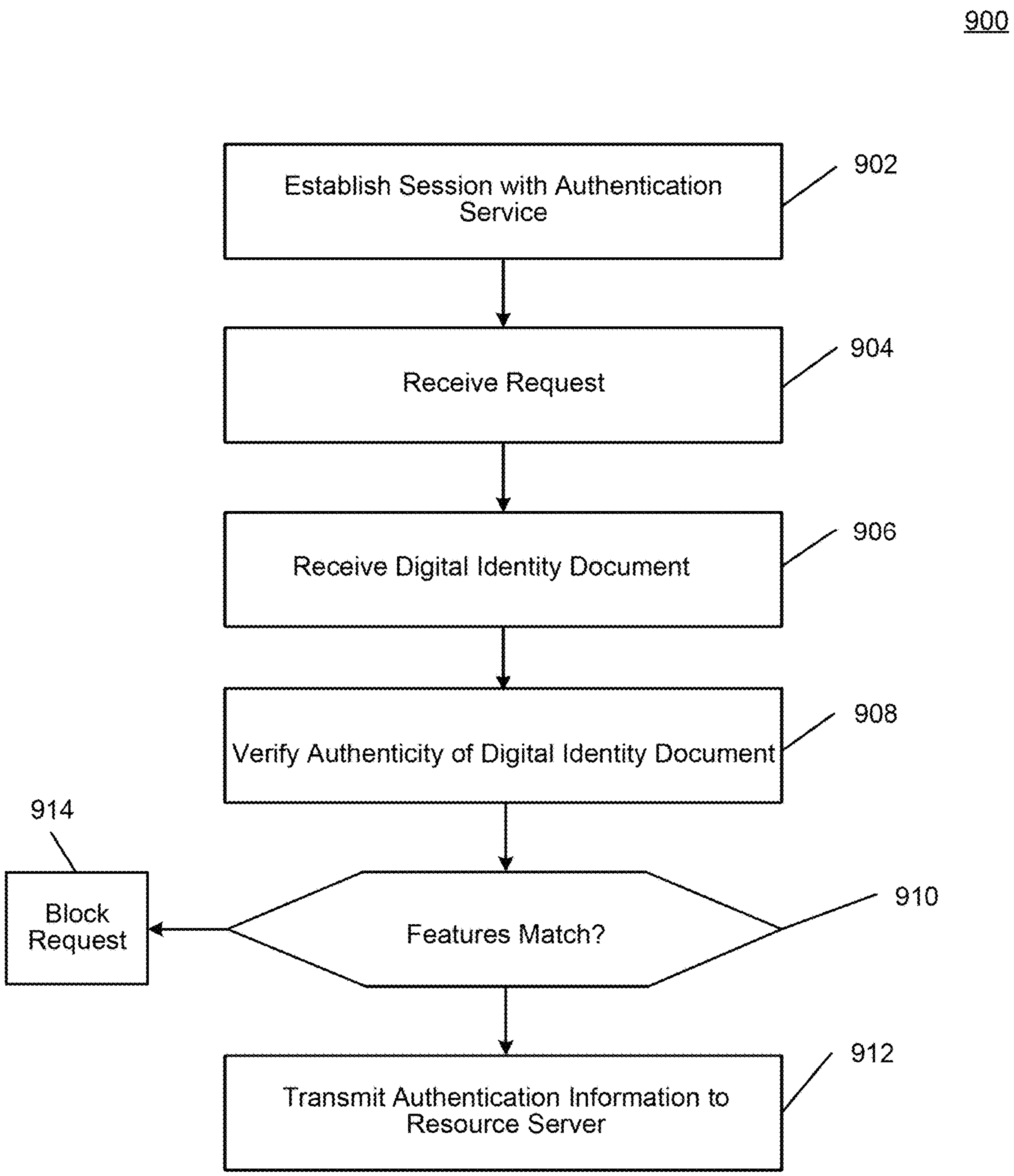
FIG. 9 is a process flow showing a method for user authentication, according to an example implementation of the present disclosure.

Referring now to FIG. 9 with reference to FIG. 1, depicted is a flowchart showing a method 900 for user verification, according to an example implementation of the present disclosure. The method 900 may be performed by the components or elements described above with reference to FIG. 1-FIG. 8B and FIG. 10-FIG. 11. As a brief overview, at step 902, the method 900 includes establishing a session with an authentication service. At step 904, the method 900 includes receiving a request. At step 906, the method 900 includes receiving a digital identity document. At step 908, the method 900 includes verifying the received identity data. At step 910, the method 900 includes determining whether a user biometric received with the request matches the digital identity document. At step 912, the method 900 includes transmitting the authentication information to the resource server. At step 914, the method 900 includes blocking the request.

At step 902, the method 900 includes establishing a session with an authentication service 110. In some embodiments, the authentication server 108 may establish the session with the authentication service 110 executing on a client device 102 of a user. The authentication server 108 may establish the session with the authentication service 110 responsive to the user attempting to access a resource 104 hosted on the resource server 106. For example, and in some implementations, a user may attempt to access the resource (as shown in FIG. 2), and prior to permitting the user access to the resource, the resource server 106 may request authentication via the authentication server 108. The authentication server 108 may establish the session with the authentication service 110 responsive to the request for authentication from the resource server 106.

At step 904, the method 900 includes receiving a request. In some embodiments, the authentication server 108 may receive a request from the client device 102 via the session with the authentication service 110 executing on the client device 102. The authentication server 108 may receive the request including an identifier identifying the resource server 106 (e.g., an address of the resource server 106, a session identifier corresponding to the attempted session between the client device 102 and resource server 106, an application identifier associated with the resource 104, and so forth), and a biometric image captured using a camera 112 of the client device 102 controlled via the authentication service 110. The request may be or include a request to authenticate the user of the client device 102 to a third-party server (e.g., the resource server 106) hosting or otherwise providing the resource 104. The user may navigate (e.g., via the client device 102) to a page, link, tab, widget, or application corresponding to the resource 104, and select a user interface element for authenticating the use via the authentication service 110 for accessing the resource 104.

The authentication service 110 may request at least a biometric image of the user as part of authenticating the user (e.g., via the authentication server 108) to the resource server 106. For example, the authentication server 108 may transmit a prompt to the client device 102, which may trigger the authentication service 110 to request the biometric image. The authentication service 110 may control the camera 112 (e.g., the hardware camera 112) to facilitate capturing the biometric image of the user.

At step 906, the method 900 includes receiving identity data associated with the user. In some embodiments, the authentication server 108 may send a request (such as an API call) to an external identity provider 118 for identity data associated with the user, such as data corresponding to a digital ID of the user. In some embodiments, when an external identity provider 118 is called to provide identity data, the external identity provider 118 may transmit a notification to the client device 102 to request the user to grant authorization to the external identity provider 118 to transmit the digital ID 116 to the authentication server 108. The request/notification may be or include a one-time password (OTP) notification. Responsive to authorization from the user of the client device 102, the external identity provider 118 may transmit the identity data (e.g., a digital ID) to the authentication server 108. In some embodiments, the identity data may be received from the client device 102. For example, the client device 102 may include a digital wallet 114 storing a digital ID associated with the user. The authentication server 108 may then obtain the digital ID from the digital wallet 114. In some implementations, the authentication server 108 may transmit a notification to the client device 102 to request the user to grant authorization to retrieve the digital ID 116 from the digital wallet 114.

At step 908, the method 900 includes verifying an authenticity of the digital ID 116. For example, the data packet in which the digital ID 116 is received by the authentication server 108 may include information used to determine the authenticity of the digital ID 116. Identity evidence retrieved from an external identity provider 118 may include self-attestation information, indicating a source of the identity provider. For example, the digital ID may be accompanied by a seal, watermark, or other official indication that the source of the digital ID is a legitimate source (e.g., a government-implemented digital ID system). The evidence validation service 136 may determine that the required self-attestation information is present in order to validate the evidence. In some embodiments, a machine-learning model 1000 can be employed to further validate authenticity of the digital ID.

Identity evidence (e.g., a digital ID 116) retrieved locally (e.g., from a digital wallet 114) may be transmitted to the authentication server 108 in a data packet including information used to determine the authenticity of the digital ID 116. For example, the digital ID 116 may be stored in the digital wallet 114 with a cryptographic value that is generated using a private key by the external identity provider 118. The evidence validation service 136, or another component of the authentication server 108, may then retrieve a public key corresponding to the private key (e.g., from the external identity provider 118). The evidence validation service 136 may decrypt, decipher, or otherwise determine information corresponding to the cryptographic value, using the public key. The evidence validation service 136 may determine whether the information is valid information (e.g., based on the information being successfully determined using the public key). In this regard, and in some implementations, the evidence validation service 136 may determine whether the digital ID 116 is a valid digital ID 116 based on the ability to successfully decrypt information from the cryptographic value using the public key.

In some implementations, the cryptographic value may be generated using the private key, to encode certain information from the digital ID 116 (e.g., legal name, address, DOB, identifier [such as driver's license number], and so forth). The evidence validation service 136 may use the public key to determine the information encoded using the private key (e.g., determine decoded information), and compare at least some of the decoded information to the information included in the digital ID 116. The evidence validation service 136 may validate the digital ID 116 responsive to a match between the decoded information and the information included in the digital ID 116. In this regard, the evidence validation service 136 may determine whether the digital ID 116 is a valid digital ID 116 based on 1) the ability to successfully decrypt information from the cryptographic value using the public key, and 2) the decrypted information matching corresponding information included on the digital ID 116.

At step 910, the method 900 includes comparing the biometric image and the identity data from the digital ID 116. For example, the biometric validation service 140 may validate, and subsequently extract features from the biometric image received with the request. The evidence validation service may extract a photo corresponding to a face of the user from the digital ID 116. The evidence validation service 136 may then compare the features from the biometric image and the face ID to determine if the faces are a match (e.g., a biometric match). To determine a match, the evidence validation service 136 may employ a series of match criterion associated with various facial features. In some embodiments, a machine-learning model 1000 may be employed to further compare the data. For example, some biometric images may not easily match with the user's digital ID (e.g., due to aging or other changes in facial features, poor quality of a digital ID photo, etc.). In such instances, the ML model 1000 may be configured to perform the comparison using further analysis techniques. Responsive to the comparison between the biometric image of the user and the face ID extracted from the digital ID 116, the authentication server 108 may store an association between the user's authentication profile 128 and at least one of the images. For example, at least one of the biometric image or the image extracted from the digital ID 116 may be stored as profile image(s) 126 within the user's authentication profile 128.

At step 912, the method 900 includes transmitting the authentication information of the user to the resource server. The authentication server 108 may authenticate the user to the resource server 106 based on the request received at step 904. As described above, the request may be or include a request to authenticate the user to the resource server 106, to access the resource 104 hosted on the resource server 106. Responsive to verifying a match between the user's biometric image and the validated digital identity evidence, the authentication server 108 may authenticate the user to the resource server 106 by making an assertion to the resource server 106, by transmitting authentication data 124 to the resource server 106 (e.g., as permitted based on sharing settings for the authentication data 124), etc. The assertion may indicate successful authentication of the user. The authentication server 108 may refer to the identifier provided in step 904 to confirm the resource server 106 that the authentication data 124 should be transmitted to.

At step 914, the method 900 includes blocking the request. In some embodiments, the authentication server 108 may block the request received at step 904, responsive to determining that the biometric image does not match the digital ID 116. The authentication server 108 may block the request by responding, e.g., to the authentication service 110, indicating that additional authentication information is needed to authenticate the user. For example, the authentication server 108 may send a request to the authentication service 110 to provide a new biometric image. Where additional authentication information is received (e.g., via the authentication service 110 from the user), the authentication server 108 may authenticate the user based on a comparison of the authentication information to the authentication data 124 included in the authentication profile 128. Upon authenticating the user, the method 900 may proceed back to step 912, where the authentication server 108 stores the biometric image as a new profile image 126 in the authentication profile.

In some embodiments, the authentication server 108 may block the request by indicating (e.g., to the resource server 106) that the user cannot be authenticated. In other words, and in some embodiments, steps 912 and 914 may be combined, where the authentication server 108 transmits authentication information to the resource server 106, where the authentication information includes an authentication status of the user. For example, where the determination made at step 910 results in a positive match between features, the authentication server 108 may transmit authentication information to the resource server 106 indicating a successful authentication status of the user. Where the determination made at step 910 results in a negative match between features (or where the authenticity of the digital ID 116 received from the external entity provider 118 or digital wallet 114 was unable to verified as authentic), the authentication server 108 may transmit authentication information to the resource server 106 indicating an unsuccessful authentication status of the user.

2. Machine Learning and Artificial Intelligence Systems

Figure 10:
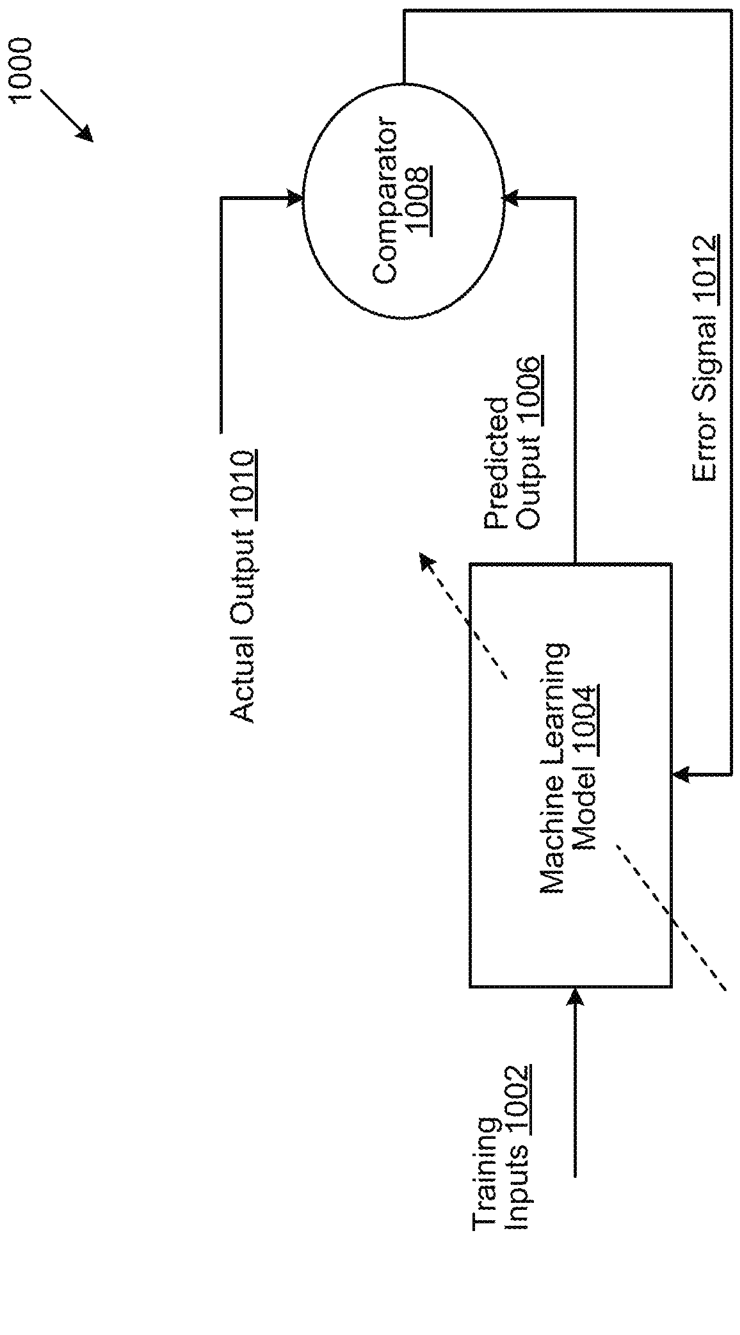
FIG. 10 is a block diagram illustrating an architecture for a computer system that can be employed to implement elements of the systems and methods described and illustrated herein.

Referring to FIG. 10, a block diagram of an example system using supervised learning is shown. The system shown in FIG. 10 may be used by or included as a component of the evidence validation service 136. Supervised learning is a method of training a machine learning model given input-output pairs. An input-output pair is an input with an associated known output (e.g., an expected output).

Machine learning model 1004 may be trained on known input-output pairs such that the machine learning model 1004 can learn how to predict known outputs given known inputs. Once the machine learning model 1004 has learned how to predict known input-output pairs, the machine learning model 1004 can operate on unknown inputs to predict an output.

The machine learning model 1004 may be trained based on general data and/or granular data (e.g., data based on a specific user) such that the machine learning model 1004 may be trained specific to a particular user.

Training inputs 1002 and actual outputs 1010 may be provided to the machine learning model 1004. Training inputs 1002 may include, for example, known fraudulent images or digitally manipulated images, fake identification documents (IDs) such as fake driver's licenses, legitimate IDs, and the like. Actual outputs 1010 may include, for example, flags or identifiers which indicate whether the images are legitimate or fraudulent.

The inputs 1002 and actual outputs 1010 may be received from one or more data structures or data repositories, from government entity repositories, and so forth. For example, a data repository may contain images of fraudulent as well as legitimate evidence which may be requested as part of an authentication process or flow. The data repository may also contain data associated with flags or identifiers which indicate whether the evidence is fraudulent or legitimate. Thus, the machine learning model 1004 may be trained to predict whether evidence provided by a user or identity provider is fraudulent or legitimate based on the training inputs 1002 and actual outputs 1010 used to train the machine learning model 1004.

In some embodiments, a single machine leaning model 1004 may be trained to make one or predictions relating to the received evidence used for authentication. In some embodiments, a plurality of machine learning models 1004 may be trained to make the one or more predictions. For example, a first machine learning model 1004 may be trained to predict whether the biometric image was legitimately captured by the client device 102, a second machine learning model 1004 may be trained to predict whether the biometric image has been digitally altered, and so forth. Further, additional machine learning model(s) 1004 may be trained to predict whether a digital ID 116 obtained from an identity provider is legitimate (e.g., verifying an authenticity of a seal or watermark provided with a digital ID from an external source), whether the digital ID 116 has been digitally altered, and so forth. The comparator 1008 may compare the predicted outputs 1006 to actual outputs 1010 to determine an amount of error or differences.

During training, the error (represented by error signal 1012) determined by the comparator 1008 may be used to adjust the weights in the machine learning model 1004 such that the machine learning model 1004 changes (or learns) over time. The machine learning model 1004 may be trained using a backpropagation algorithm, for instance. The backpropagation algorithm operates by propagating the error signal 1012. The error signal 1012 may be calculated each iteration (e.g., each pair of training inputs 1102 and associated actual outputs 1010), batch and/or epoch, and propagated through the algorithmic weights in the machine learning model 1004 such that the algorithmic weights adapt based on the amount of error. The error is minimized using a loss function. Non-limiting examples of loss functions may include the square error function, the root mean square error function, and/or the cross entropy error function.

The weighting coefficients of the machine learning model 1004 may be tuned to reduce the amount of error, thereby minimizing the differences between (or otherwise converging) the predicted output 1006 and the actual output 1010. The machine learning model 1004 may be trained until the error determined at the comparator 1008 is within a certain threshold (or a threshold number of batches, epochs, or iterations have been reached). The trained machine learning model 1004 and associated weighting coefficients may subsequently be stored in a database such that the machine learning model 1004 may be employed on unknown data (e.g., not training inputs 1002). Once trained and validated, the machine learning model 1004 may be employed during a testing (or an inference phase). During testing, the machine learning model 1004 may ingest unknown data to predict future data (e.g., legitimate vs. illegitimate evidence).

Figure 11:
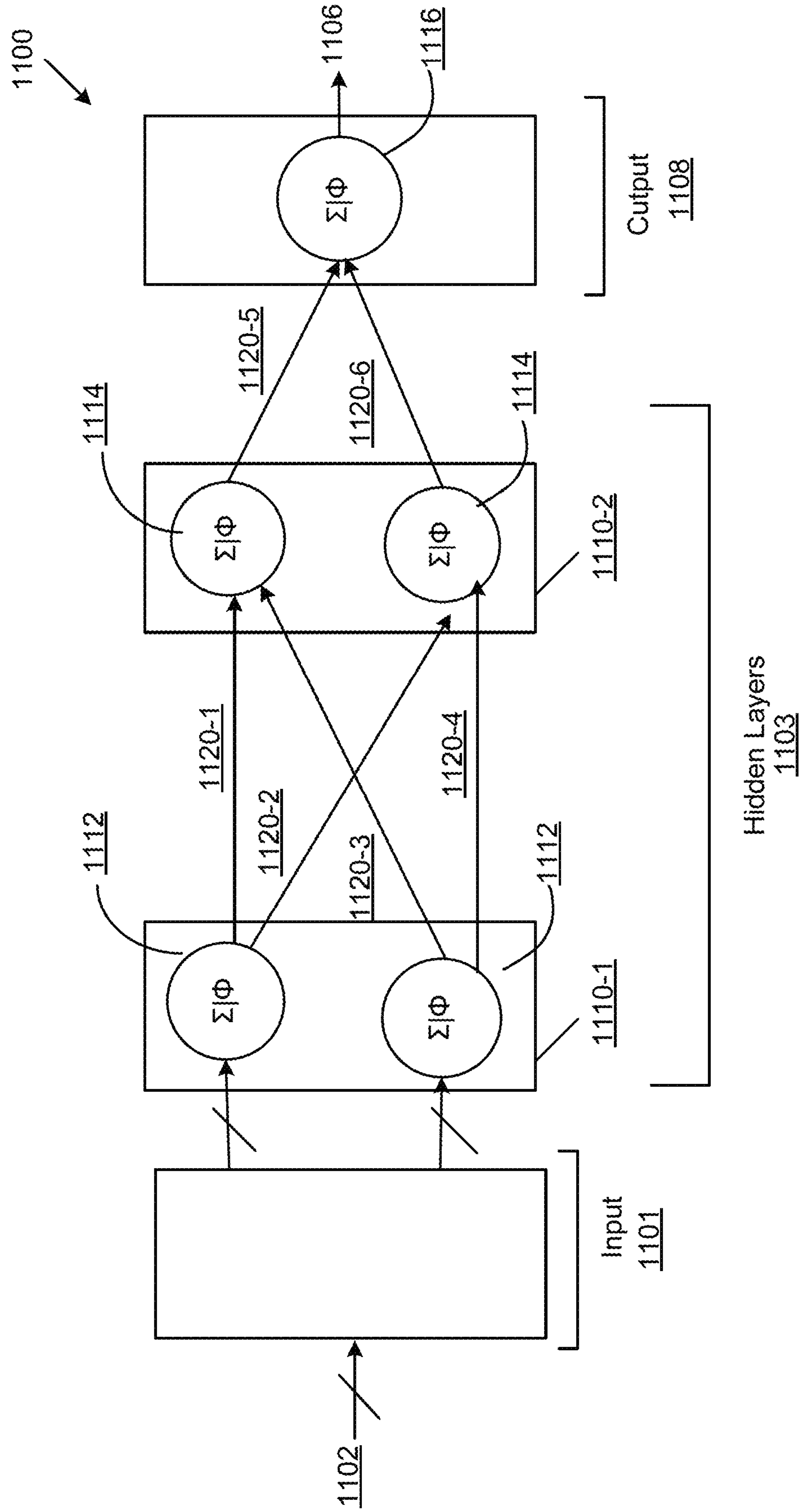
FIG. 11 is a block diagram of a simplified neural network model, according to an example implementation of the present disclosure.

Referring to FIG. 11, a block diagram of a simplified neural network model 1100 is shown. The neural network model 1100 may include a stack of distinct layers (vertically oriented) that transform a variable number of inputs 1102 being ingested by an input layer 1104, into an output 1106 at the output layer 1108.

The neural network model 1100 may include a number of hidden layers 1110 between the input layer 1104 and output layer 1108. Each hidden layer has a respective number of nodes (1112, 1114 and 1116). In the neural network model 1100, the first hidden layer 1110-1 has nodes 1112, and the second hidden layer 1110-2 has nodes 1114. The nodes 1112 and 1114 perform a particular computation and are interconnected to the nodes of adjacent layers (e.g., nodes 1112 in the first hidden layer 1110-1 are connected to nodes 1114 in a second hidden layer 1110-2, and nodes 1114 in the second hidden layer 1110-2 are connected to nodes 1116 in the output layer 1108). Each of the nodes (1112, 1114 and 1116) sum up the values from adjacent nodes and apply an activation function, allowing the neural network model 1100 to detect nonlinear patterns in the inputs 1102. Each of the nodes 1112, 1114 and 1116) are interconnected by weights 1120-1, 1120-2, 1120-3, 1120-4, 1120-5, 1120-6 (collectively referred to as weights 1120). Weights 1120 are tuned during training to adjust the strength of the node. The adjustment of the strength of the node facilitates the neural network's ability to predict an accurate output 1106.

In some embodiments, the output 1106 may be one or more numbers. For example, output 1106 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

3. Computer Architecture

Figure 12:
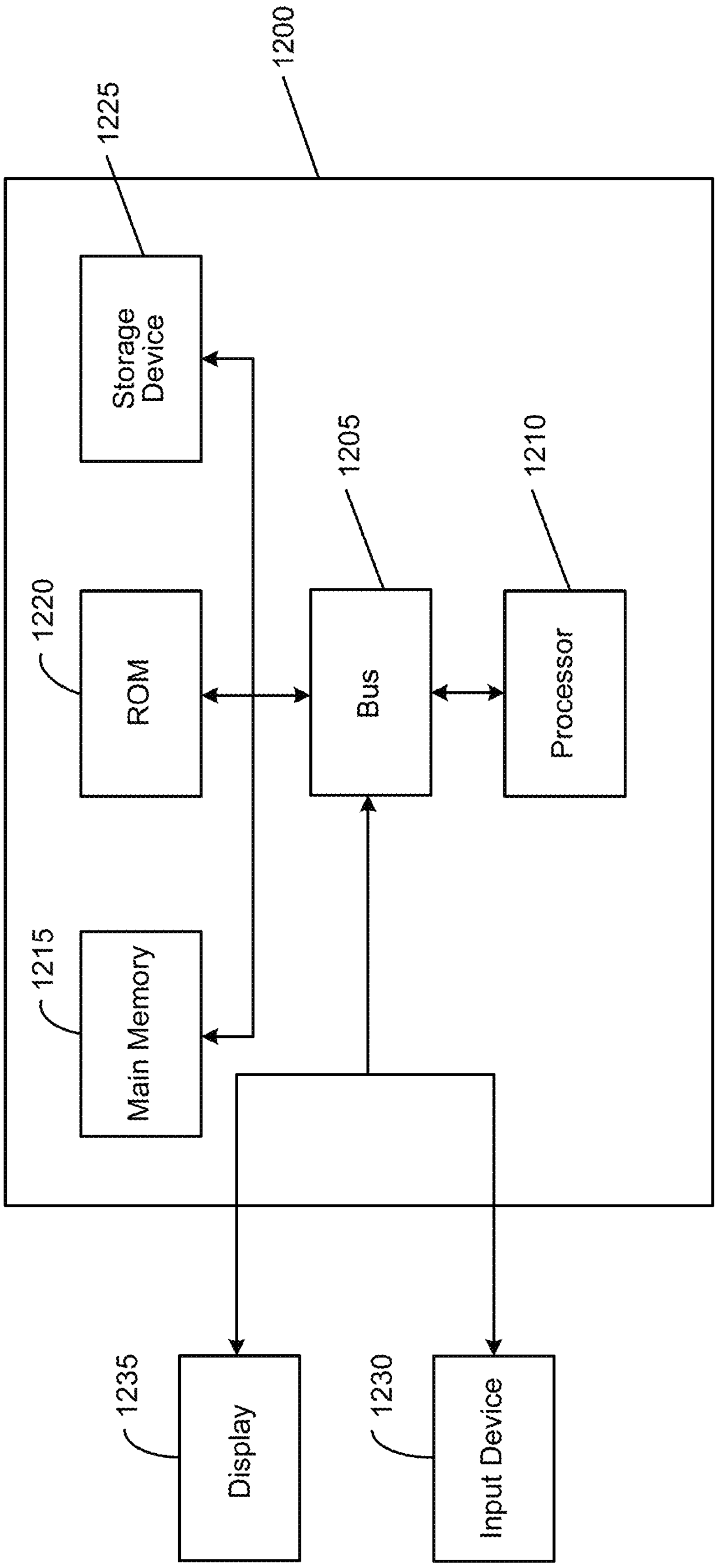
FIG. 12 is a block diagram of an example computer system, according to an example implementation of the present disclosure.

FIG. 12 depicts an example block diagram of an example computer system 1200. The computer system or computing device 1200 can include or be used to implement a data processing system or its components. The computing system 1200 includes at least one bus 1205 or other communication component for communicating information and at least one processor 1210 or processing circuit coupled to the bus 1205 for processing information. The computing system 1200 can also include one or more processors 1210 or processing circuits coupled to the bus for processing information. The computing system 1200 also includes at least one main memory 1215, such as a random access memory (RAM) or other dynamic storage device, coupled to the bus 1205 for storing information, and instructions to be executed by the processor 1210. The main memory 1215 can be used for storing information during execution of instructions by the processor 1210. The computing system 1200 may further include at least one read only memory (ROM) 1220 or other static storage device coupled to the bus 1205 for storing static information and instructions for the processor 1210. A storage device 1225, such as a solid state device, magnetic disk or optical disk, can be coupled to the bus 1205 to persistently store information and instructions.

The computing system 1200 may be coupled via the bus 1205 to a display 1235, such as a liquid crystal display, or active matrix display, for displaying information to a user. An input device 1230, such as a keyboard or voice interface may be coupled to the bus 1205 for communicating information and commands to the processor 1210. The input device 1230 can include a touch screen display 1235. The input device 1230 can also include a cursor control, such as a mouse, a trackball, or cursor direction keys, for communicating direction information and command selections to the processor 1210 and for controlling cursor movement on the display 1235.

The processes, systems and methods described herein can be implemented by the computing system 1200 in response to the processor 1210 executing an arrangement of instructions contained in main memory 1215. Such instructions can be read into main memory 1215 from another computer-readable medium, such as the storage device 1225. Execution of the arrangement of instructions contained in main memory 1215 causes the computing system 1200 to perform the illustrative processes described herein. One or more processors in a multi-processing arrangement may also be employed to execute the instructions contained in main memory 1215. Hard-wired circuitry can be used in place of or in combination with software instructions together with the systems and methods described herein. Systems and methods described herein are not limited to any specific combination of hardware circuitry and software.

Although an example computing system has been described in FIG. 12, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The invention claimed is:

1. A method of authenticating a user, the method comprising:

receiving, by an authentication server from a client device, at least one first data packet including i) image data corresponding to a biometric image captured during an authentication process and ii) an identifier identifying a resource server, the at least one first data packet received in connection with a first request for authenticating the user to access a resource of the resource server;

transmitting, by the authentication server to an identity provider, a second request that causes the identity provider to transmit a notification to a registered client device comprising at least one of the client device or a second client device, the identity provider identifying the registered client device based on an association of the registered client device with a digital identity document originating from and issued by the identity provider, the notification requesting the user to grant authorization to the identity provider to transmit identity data corresponding to the digital identity document to the authentication server;

receiving, by the authentication server from the identity provider, at least one second data packet including the identity data corresponding to the digital identity document of the user, the digital identity document including an image of the user, the at least one second data packet received from the identity provider responsive to authorization from the registered client device;

verifying, by the authentication server, an authenticity of the identity data, based on information included in the at least one second data packet;

comparing, by the authentication server, the image data of the at least one first data packet and the identity data of the at least one second data packet; and transmitting, by the authentication server using the identifier included in the at least one first data packet, authentication information of the user to the resource server, based on the comparison and the authenticity of the identity data.

2. The method of claim 1, wherein the notification comprises a one-time password (OTP) notification.

3. The method of claim 1, wherein the information for verifying the authenticity of the digital identity document comprises self-attestation information, which indicates a source of the digital identity document as the identity provider.

4. The method of claim 3, wherein verifying the authenticity of the digital identity document is responsive to a presence of the self-attestation information in the at least one second data packet.

5. The method of claim 1, wherein receiving the at least one second data packet comprises obtaining the at least one second data packet from a second identity provider, wherein the second identity provider receives the digital identity document from the identity provider, and wherein the second identity provider comprises a digital wallet that locally stores the digital identity document on the client device.

6. The method of claim 5, wherein the information included in the at least one second data packet comprises first information, wherein verifying the authenticity of the digital identity document comprises:

determining, by the authentication server, the first information generated by a source system associated with the identity provider using a private key for the digital identity document;

determining, by the authentication server, second information for the digital identity document, using a public key corresponding to the private key;

comparing, by the authentication server, the first information and the second information, wherein the authenticity of the digital identity document is verified responsive to a match between the first information and the second information.

7. The method of claim 1, wherein the digital identity document is stored at the identity provider, and receiving the at least one second data packet is responsive to an application program interface (API) call to the identity provider.

8. The method of claim 1, further comprising:

storing, by the authentication server, in one or more data structures, an association between an authentication profile established for the user and at least one of the image of the user from the digital identity document or the biometric image, responsive the comparison between the image of the user and the biometric image satisfying a match criterion and the authenticity of the digital identity document being verified.

9. The method of claim 1, wherein the first request is received responsive to at least one of an initial request from the resource server, or an attempt to access the resource via at least one of the client device or a second client device.

10. The method of claim 9, further comprising:

transmitting, by the authentication server, to the client device, a prompt to trigger capturing of the biometric image, responsive to the initial request or the attempt to access the resource, wherein the at least one first data packet is received responsive to the prompt.

11. The method of claim 1, wherein the authentication information indicates successful authentication of the user, responsive to the comparison satisfying a match criterion and the authenticity of the digital identity document being verified.

12. An authentication server, comprising:

at least one processor configured to:

receive, from a client device, at least one first data packet including i) image data corresponding to a biometric image captured during an authentication process and ii) an identifier identifying a resource server, the at least one first data packet received in connection with a first request for authenticating a user to access a resource of the resource server;

transmit, to an identity provider, a second request that causes the identity provider to transmit a notification to a registered client device comprising at least one of the client device or a second client device, the identity provider identifying the registered client device based on an association of the registered client device with a digital identity document originating from and issued by the identity provider, the notification requesting the user to grant authorization to the identity provider to transmit identity data corresponding to the digital identity document to the authentication server;

receive, from the identity provider, at least one second data packet including the identity data corresponding to the digital identity document of the user, the digital identity document including an image of the user, the at least one second data packet received from the identity provider responsive to authorization from the registered client device;

verify an authenticity of the identity data, based on information included in the at least one second data packet;

compare the image data of the at least one first data packet and the identity data of the at least one second data packet; and transmit, using the identifier included in the at least one first data packet, authentication information of the user to the resource server, based on the comparison and the authenticity of the identity data.

13. The authentication server of claim 12, wherein the information for verifying the authenticity of the digital identity document comprises self-attestation information, which indicates a source of the digital identity document as the identity provider.

14. The authentication server of claim 12, wherein the digital identity document is at least one of stored locally in a digital wallet of the client device and obtained by the client device from a source system associated with the identity provider, or obtained via an application program interface (API) call from the source system.

15. The authentication server of claim 14, wherein the information included in the at least one second data packet comprises first information, wherein to verify the authenticity of the digital identity document, the at least one processor is configured to:

determine the first information generated by the source system using a private key for the digital identity document;

determining, by the authentication server, second information for the digital identity document, using a public key corresponding to the private key;

comparing, by the authentication server, the first information and the second information, wherein the authenticity of the digital identity document is verified responsive to a match between the first information and the second information.

16. A non-transitory computer readable medium storing instructions that, when executed by one or more processors of an authentication server, cause the one or more processors to:

receive, from a client device, at least one first data packet including i) image data corresponding to a biometric image captured during an authentication process and ii) an identifier identifying a resource server, the at least one first data packet received in connection with a first request for authenticating a user to access a resource of the resource server;

transmit, to an identity provider, a second request that causes the identity provider to transmit a notification to a registered client device comprising at least one of the client device or a second client device, the identity provider identifying the registered client device based on an association of the registered client device with a digital identity document originating from and issued by the identity provider, the notification requesting the user to grant authorization to the identity provider to transmit identity data corresponding to the digital identity document to the authentication server;

receive, from the identity provider, at least one second data packet including the identity data corresponding to the digital identity document of the user, the digital identity document including an image of the user, the at least one second data packet received from the identity provider responsive to authorization from the registered client device;

verify an authenticity of the identity data, based on information included in the at least one second data packet;

compare the image data of the at least one first data packet and the identity data of the at least one second data packet; and transmit, using the identifier included in the at least one first data packet, authentication information of the user to the resource server, based on the comparison and the authenticity of the identity data.

* * * * *